Aug. 24, 1948.　　　　　F. M. LEWIS　　　　　2,447,513
FUEL INJECTION MEANS FOR FREE PISTON ENGINES
Filed Aug. 4, 1944　　　　　　　　　　　　10 Sheets-Sheet 1
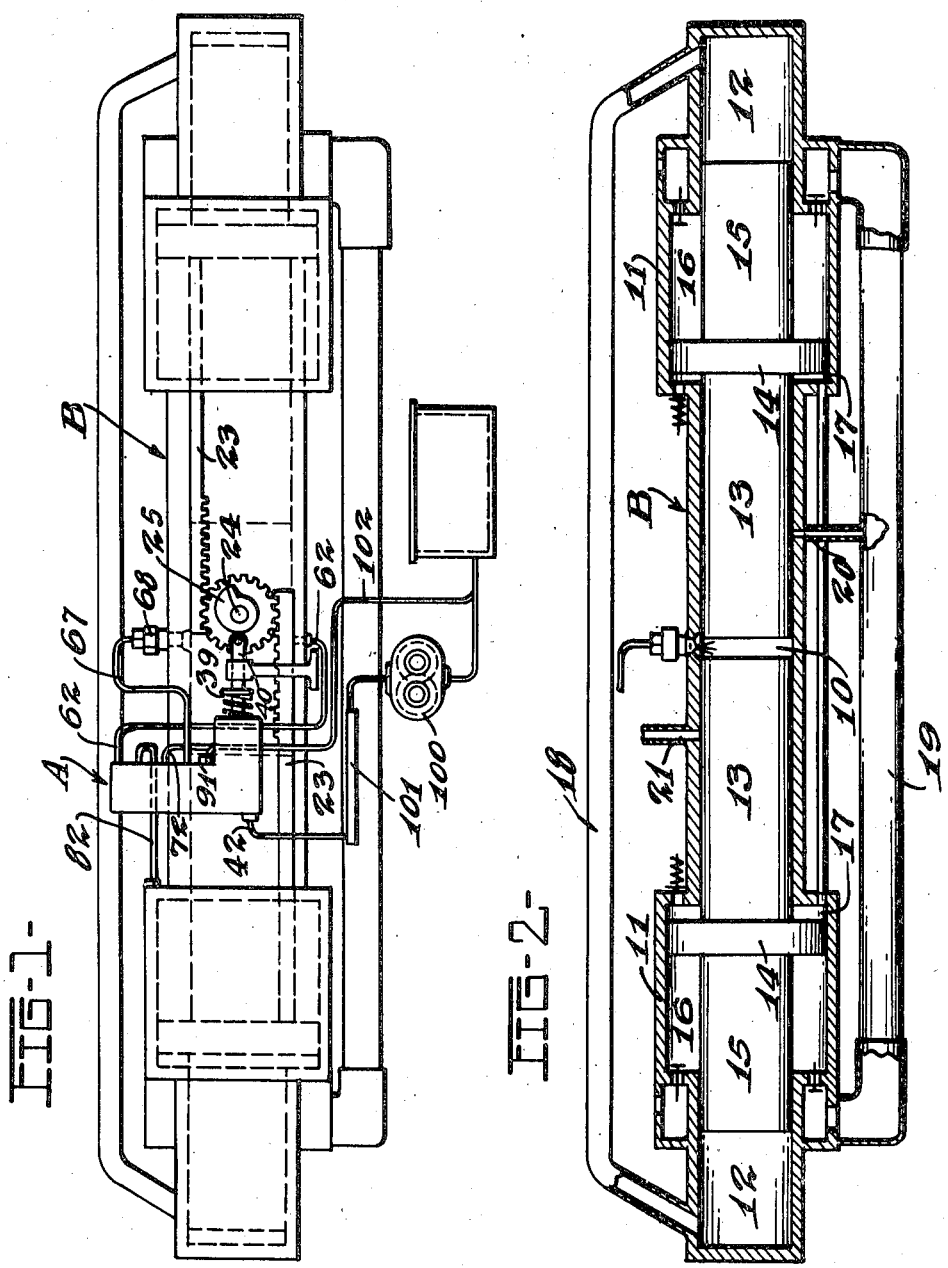
Inventor
FRANK M. LEWIS
By Owen & Owen
Attorneys

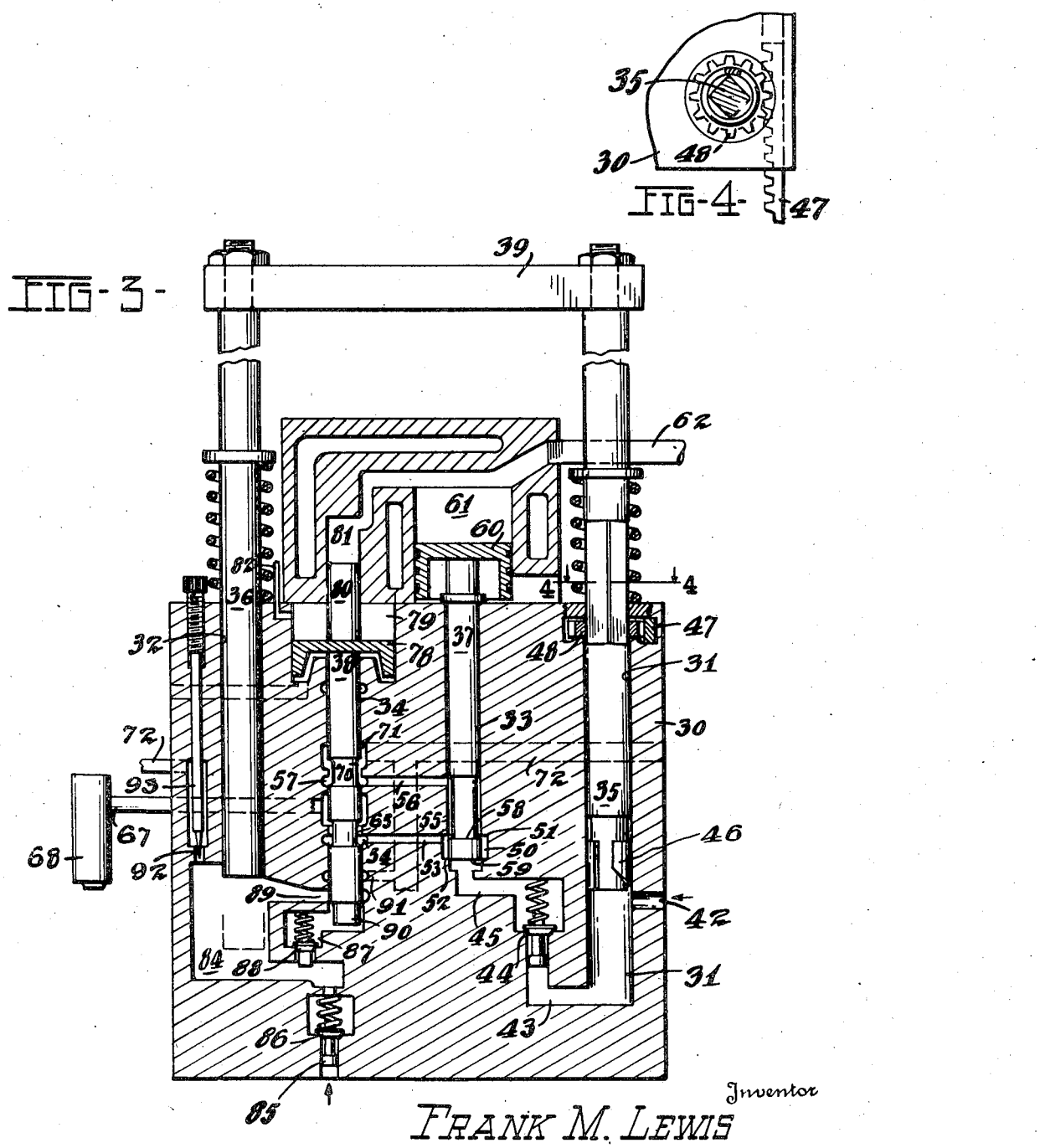

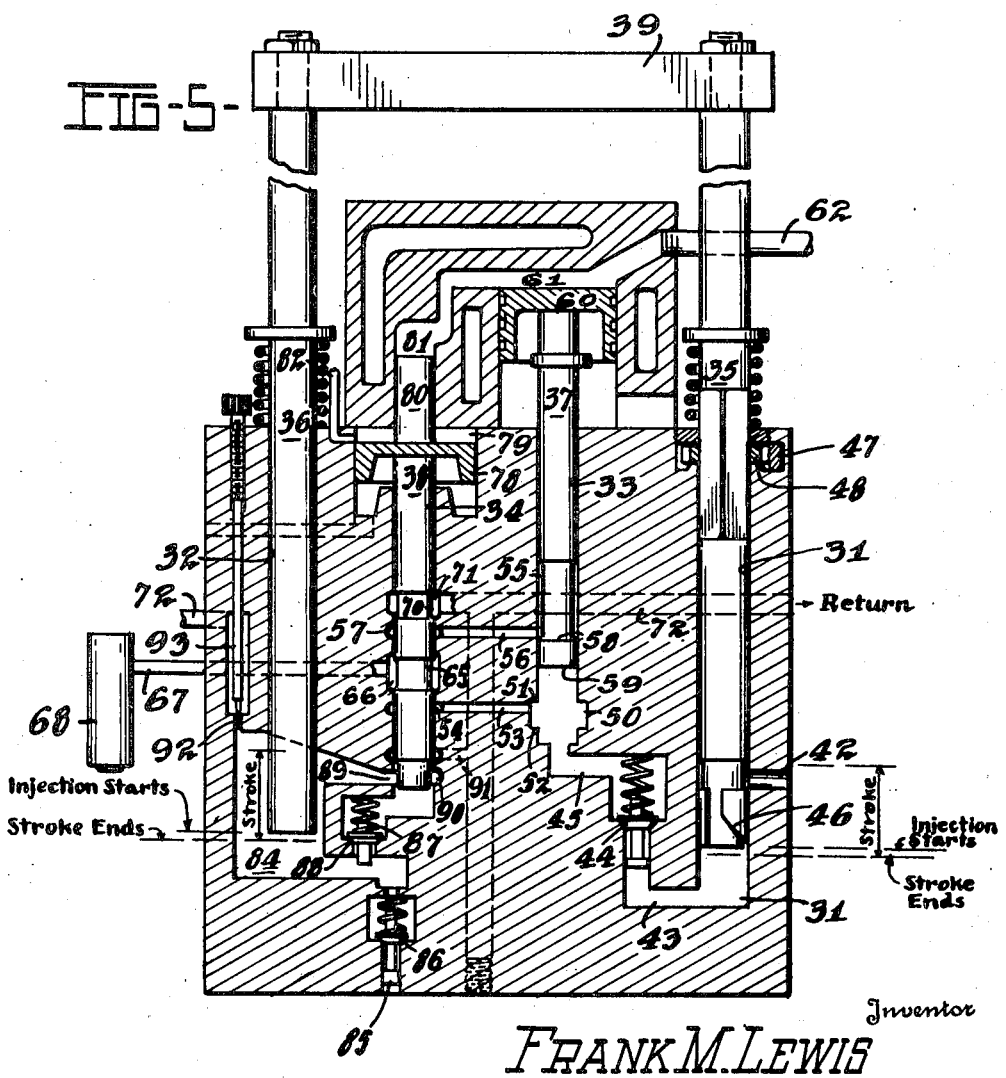

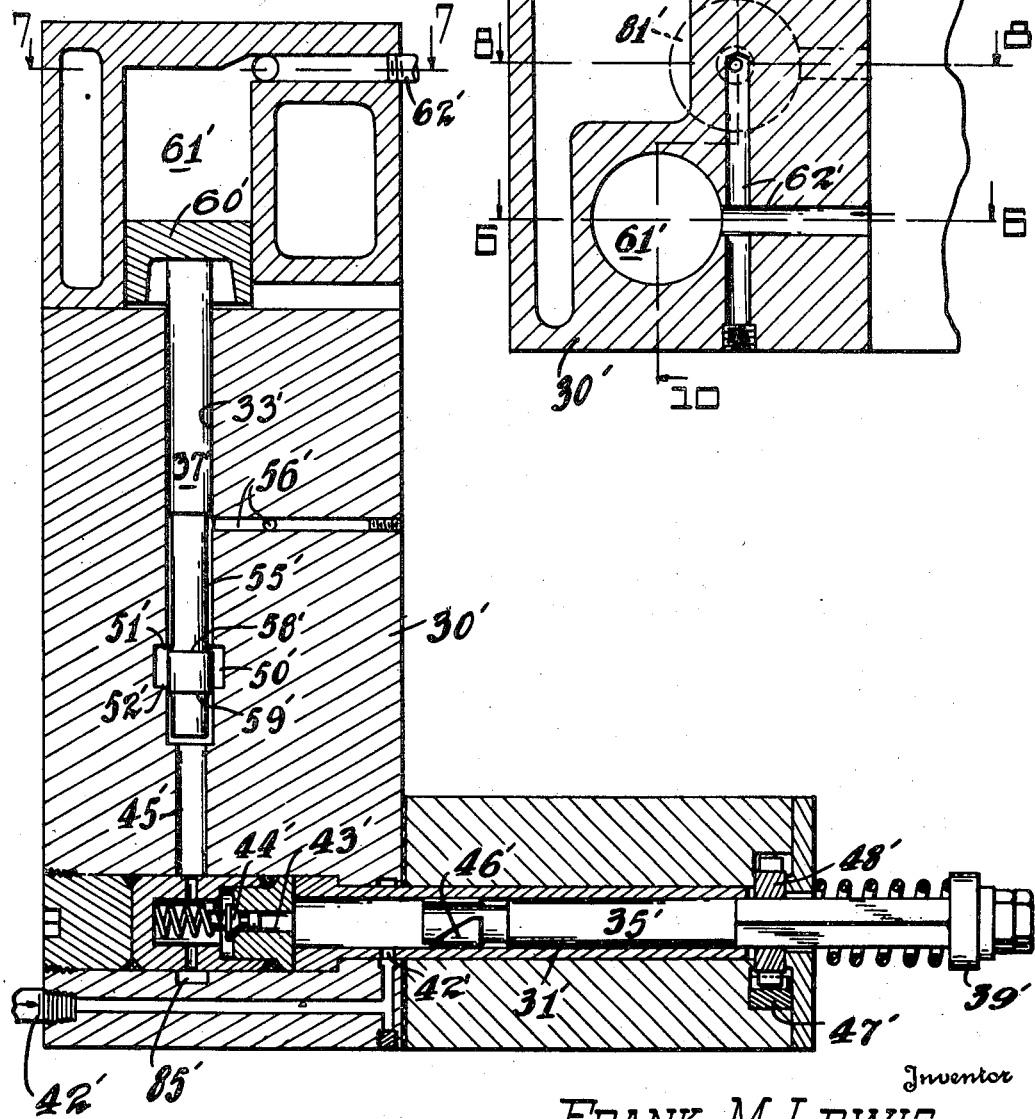

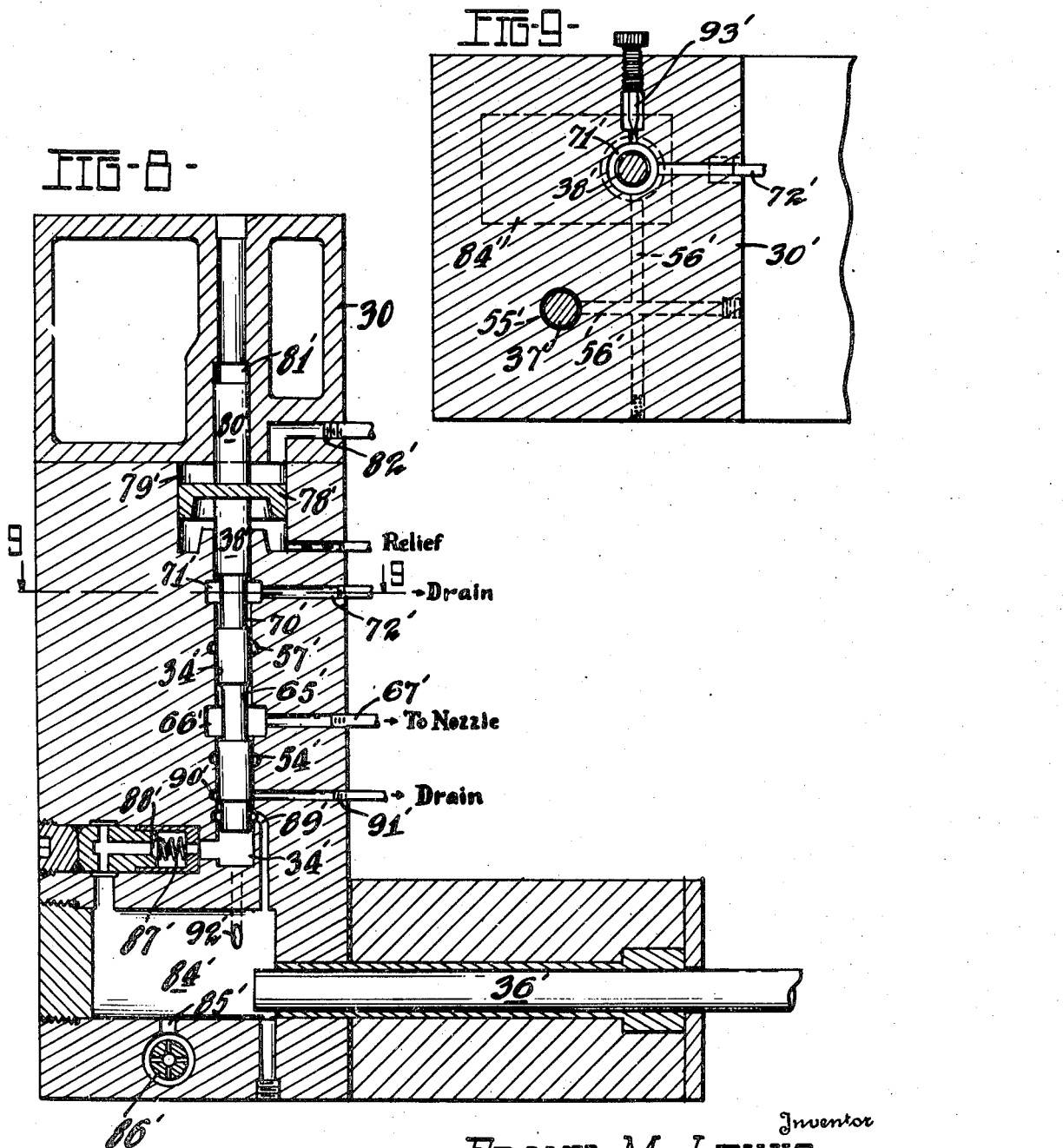

Aug. 24, 1948.  F. M. LEWIS  2,447,513
FUEL INJECTION MEANS FOR FREE PISTON ENGINES
Filed Aug. 4, 1944  10 Sheets-Sheet 6
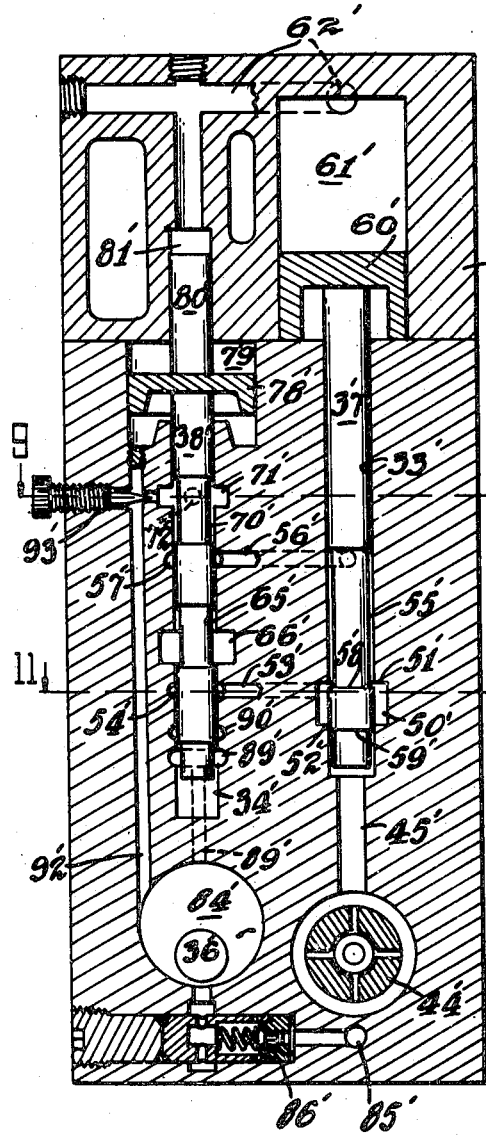
Inventor
FRANK M. LEWIS
By Owen & Owen
Attorneys Aug. 24, 1948.  F. M. LEWIS  2,447,513
FUEL INJECTION MEANS FOR FREE PISTON ENGINES
Filed Aug. 4, 1944   10 Sheets-Sheet 7
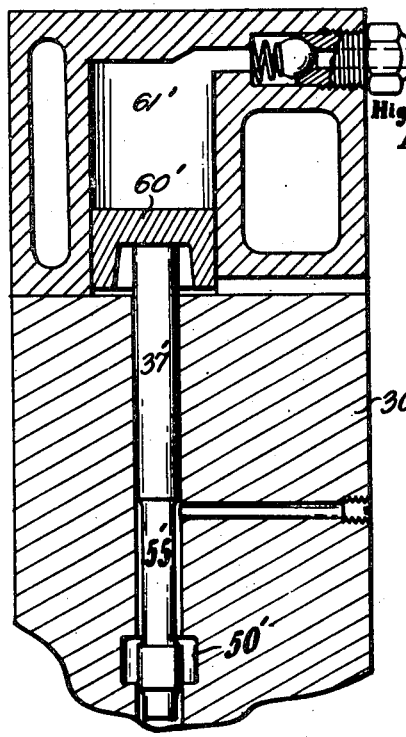
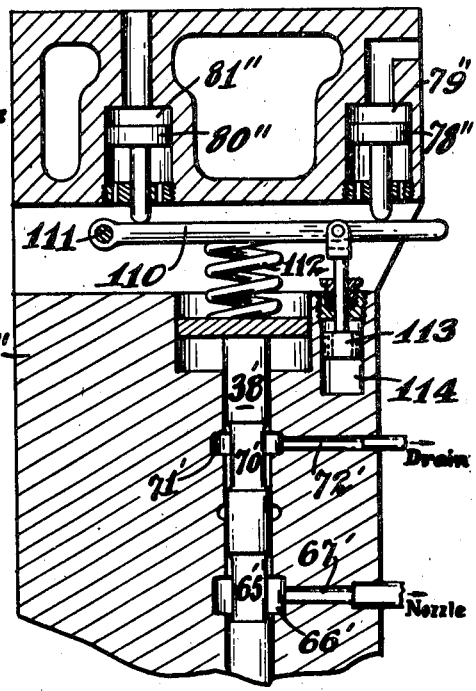
Inventor
FRANK M. LEWIS
By Owen & Owen
Attorneys Aug. 24, 1948.   F. M. LEWIS   2,447,513
FUEL INJECTION MEANS FOR FREE PISTON ENGINES
Filed Aug. 4, 1944   10 Sheets-Sheet 8
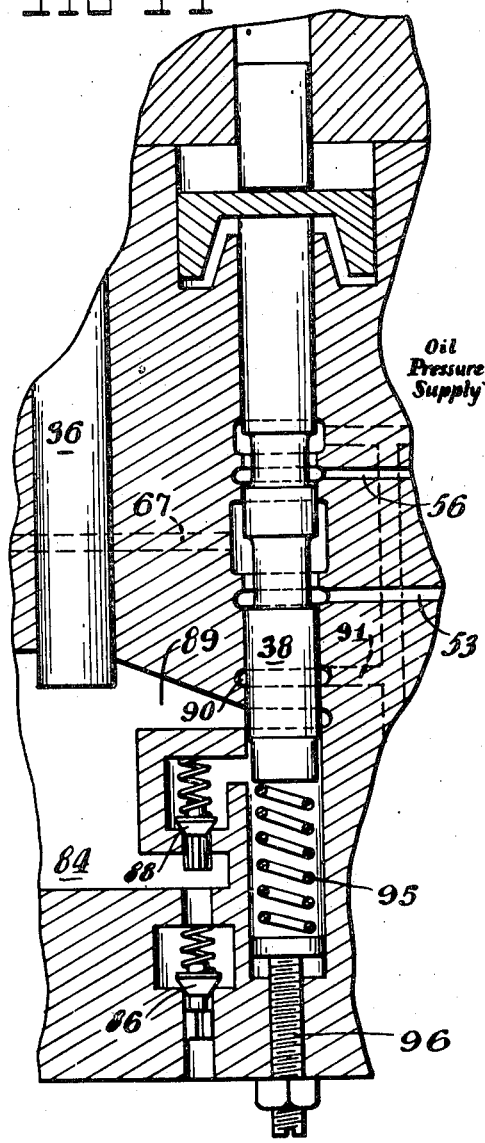
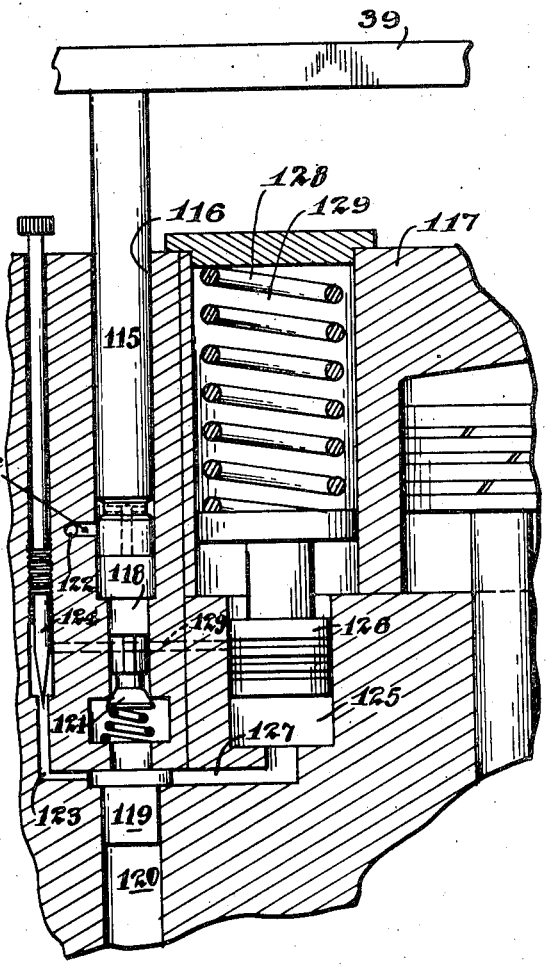
Inventor
FRANK M. LEWIS
By Owen & Owen,
Attorneys.

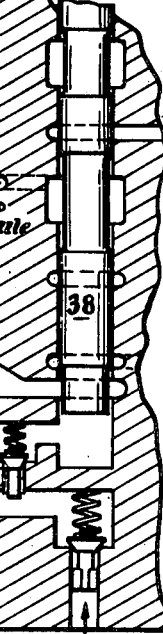

Aug. 24, 1948.  F. M. LEWIS  2,447,513
FUEL INJECTION MEANS FOR FREE PISTON ENGINES
Filed Aug. 4, 1944  10 Sheets-Sheet 10
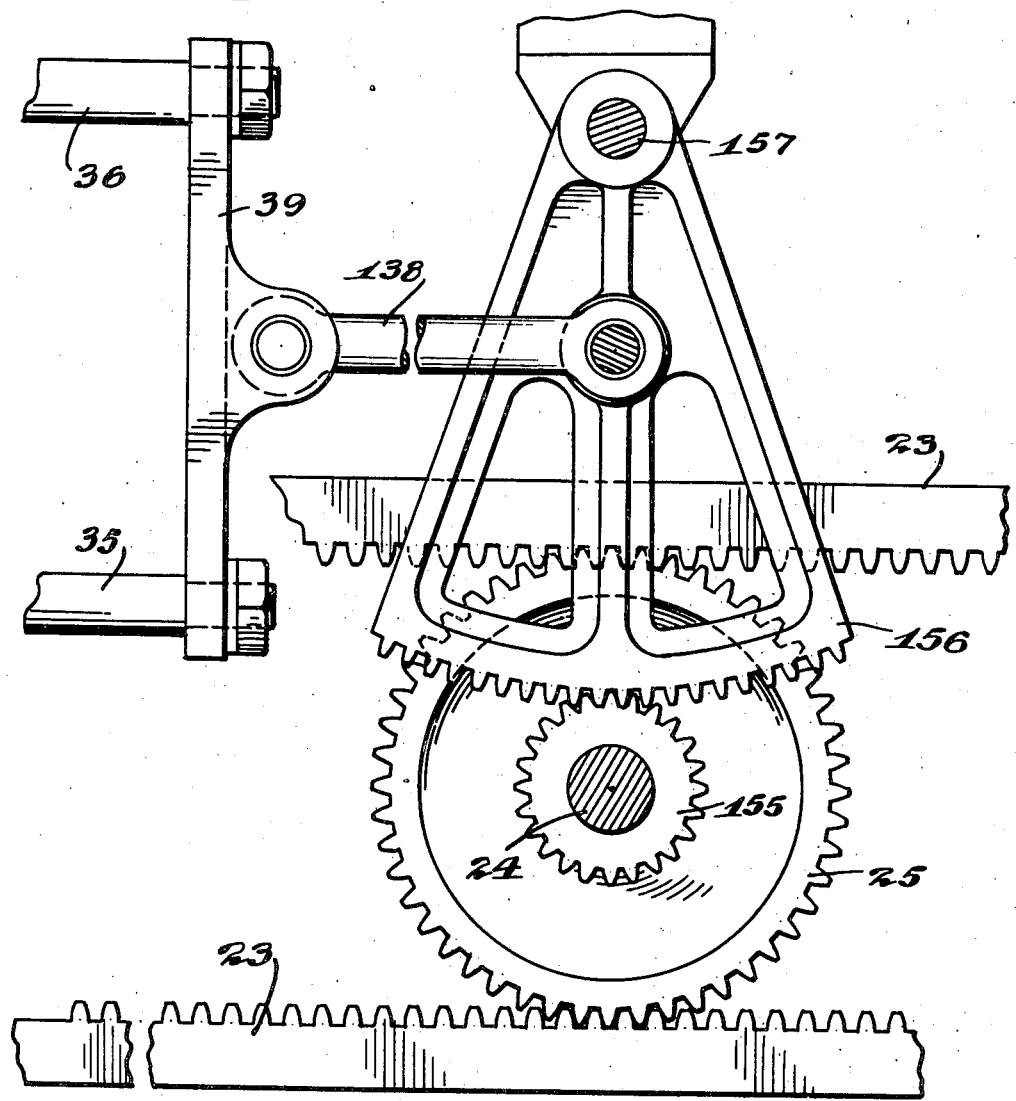
Inventor
FRANK M. LEWIS Patented Aug. 24, 1948

2,447,513

UNITED STATES PATENT OFFICE 2,447,513

FUEL INJECTION MEANS FOR FREE PISTON ENGINES

Frank M. Lewis, Weston, Mass., assignor, by mesne assignments, to Lima-Hamilton Corporation, Hamilton, Ohio, a corporation of Virginia Application August 4, 1944, Serial No. 548,116

21 Claims. (Cl. 123—46)

This invention relates to fuel injection means and methods for internal combustion engines, and particularly to a fuel pump operable in conjunction with the fuel injection systems of such engines of the free piston type.

In the running of engines of this type, the positions attained by the pistons at the combustion end of a stroke, when fuel is to be injected, will vary with the load and the speed. Therefore, if a type of fuel injector is used in which injections occur when the piston reaches a certain point in the cylinder, this variation in stroke introduces undesirable variation in the timing of injections of the fuel with reference to the combustion end of the stroke, so that the injection may occur too early, too late or possibly not at all. A very small portion of the piston motion at the end of the stroke is available to effect the injection, and this introduces serious mechanical difficulties in the drive of such a pump.

The object of the invention is to obviate the above-noted objections by the provision of means which is operable by a running of a free piston engine to time the fuel injections by the relation of the piston to the end of its compression stroke, regardles of how the length of the stroke may vary with variations of the load and speed of the engine.

Another object of the invention is the provision of a fuel pump for free piston engines which in its operation will utilize a large part of the piston stroke of the engine to pump fuel, thus obviating the mechanical difficulties abovementioned.

Another object of the invention is the provision in connection with an internal combustion engine of the free piston type, of fuel injection means therefor wherein the timing of fuel injections is determined primarily by the change of speed of the engine pistons as they near the ends of their compression strokes.

A further object of the invention is to modify the fuel charge timing in an engine of the free piston type in accordance with the engine speed by utilizing, in part at least, pressures generated in the combustion and rebounce chambers of the engine or in either one of them.

Further objects and advantages of the invention will be apparent from the following detailed description and from the accompanying drawings, in which—

Figure 1 is a somewhat diagrammatical side view of a free piston engine, with a fuel injection means embodying the invention in operative connection therewith and with the pistons at substantially the outer ends of their expansion strokes; Fig. 2 is a somewhat diagrammatical central longitudinal section of the engine, with parts in full and with the pistons shown at the ends of their compression strokes; Fig. 3 is a diagrammatical view of the injection means, with the plungers in parallel relation in a common plane and with such plungers in the relative positions which they have at the beginning of a compression stroke of the engine pistons; Fig. 4 is a fragmentary section on the line 4—4 in Fig. 3 showing the pump plunger adjusting means; Fig. 5 is a diagrammatical view similiar to that of Fig. 3 showing the relative position of the plungers when the engine pistons are near the end of a compression stroke and immediately before the fuel ejection charges takes place; Figs. 6 to 11 are different sectional views of an operative form of the fuel injection means embodying the invention, with the parts corresponding to those in the diagrammatical Figures 3 and 5 and with Fig. 6 a vertical section on the line 6—6 in Fig. 7, with parts in full; with Fig. 7 a cross-section on the line 7—7 in Fig. 6, with a portion broken away; with Fig. 8 a vertical section on the line 8—8 in Fig. 7, with parts broken away; with Fig. 9 a cross-section on the line 9—9 in both Figs. 8 and 10, with a part broken away; with Fig. 10 a vertical section on the line 10—10 in Figs. 7 and 11, with parts in full, and with Fig. 11 a cross-section on the line 11—11 in Fig. 10. Fig. 12 is a fragmentary sectional view similar to Fig. 6 wherein the injection plunger is operated by high pressure air; Fig. 13 is a fragmentary sectional view of a modified form of the power translating means shown in connection with the trigger plunger to move it to open fuel charge position; Fig. 14 is a fragmentary view of the diagrammatical arrangement shown in Fig. 3, with a compensating spring acting on the lower end of the trigger plunger to retain it in raised or closed position; Fig. 15 is a fragmentary view of Fig. 3, showing a modification of the means employed to move the trigger valve to open position; Fig. 16 is a fragmentary showing of another modification of the means for moving the trigger valve to closed position; Fig. 17 is a fragmentary view of Fig. 3 including a modification of the relief valve operating means whereby its movements are automatically controlled by engine generated pressures, and Fig. 18 is a detail of a modified means for communicating synchronizing movements to the pump and timing plungers from the engine pistons.

Referring to the drawings, A designates the fuel pump in which the invention resides, and B an engine of the free piston type with which the pump is associated.

The engine B (Figs. 1 and 2), which is a more or less conventional showing so that the operation of the fuel pump in connection therewith may be understood, includes, as is common with such engines, a combustion chamber 10 and at each of opposite ends thereof a cylinder 11, and at the outer end of each of these a direct bounce chamber 12 with the chambers 10 and 12 of approximately the same diameter and the cylinders 11 of larger diameter. A pair of power pistons 13, 13 are mounted in opposed relation in the chamber 10, and each projects into the respective cylinder 11 and carries therein an air compressor piston 14 with a piston 15 projecting from its outer side into the associated bounce chamber 12. Each cylinder 11 is divide by its piston 14 into an air compressor chamber 16 at its outer end and a reverse bounce chamber 17 at its inner end. The direct bounce chambers 12 are in pressure equalizing communication through a connection 18. The compressor chambers 16 are in outwardly opening check valve communication with a scavenging receiver 19. The scavenging receiver 19 has a port connection 20 with one end portion of the combustion chamber 10, so that it is uncovered by the closing piston 13 at the end of its power or expansion stroke. An exhaust passage 21 is provided near the other end of the combustion chamber in position to be uncovered by its closing piston 13 near the end of its power or expansion stroke, but before the opening of the scavenging port connection, as well understood in the art. Suitable check valve controlled air admission passages are provided for the chambers 16 and 17, and an outwardly opening pressure relief valve is provided for the rebounce chambers, as well understood in the art.

A mechanical connection is provided between the two sets of pistons to cause them to operate in unison. This connection, as illustrated in Fig. 1, includes a rack bar 23 projecting inward from each compressor piston at the outer side of the combustion chamber 10 and having respective driving pinion connection with a cam shaft 24 whereby such shaft is driven in one direction by expansion strokes of the pistons 13, 13 and in a reverse direction by the compression strokes thereof. A cam or eccentric 25 is mounted on the shaft 24, and the rotary reciprocatory movements imparted thereto by the inward and outward movements of the pistons are utilized to impart the movement to the mechanically operated parts of the fuel pump, as hereinafter described. Another form of operating connection between the piston rack bars 23 and the driven parts of the fuel injection means is illustrated in Fig. 18 and will be later described.

The fuel pump A, which is diagrammatically shown in Figs. 3 and 5, to facilitate an understanding of its operation and one practical embodiment of which is shown in Figs. 6 to 11, comprises a body or casing part 30 having bores 31, 32, 33 and 34 therein in which respectively operate a pump plunger 35, a timing plunger 36, a combination injection plunger and valve 37, and a trigger valve 38 of plunger form. For convenience of description and understanding of the invention, these several plungers are shown in Figs. 3 and 5 as disposed with their axes in a common plane of the body casing 30, but this positioning and relationship can be varied, except that the pump and timing plungers 35 and 36, which receive their actuation from the mechanical synchronizing connection between the sets of pistons, should, for simplicity of operating connections, have their axial movements in parallelism. For this purpose, the plungers 35 and 36 may be fixedly connected at their outer ends by a cross-bar 39, which, in the present instance, has a push rod 40 (Fig. 1) projecting therefrom and in spring thrust engagement at its outer end with the peripheral face of the eccentric 25. This operating connection is such that the plungers 35 and 36 duplicate in a reduced degree the movements of the engine pistons, with the instrokes of the two plungers corresponding to the compression strokes of the power pistons, while the outstrokes of the plungers correspond to the expansion strokes of the power pistons. In Figs. 6 to 11 the pump and timing plungers 35 and 36 have their movements at right angles to those of the plungers 37 and 38.

The bore 31 for the pump plunger has a fuel inlet port 42 near its inner end, and such end is connected by a passage 43 through an outwardly opening check valve 44 to a charge chamber 45 at the inner end of the bore 33. The pump plunger 35 cooperates with the fuel admission port 42 to regulate its closing in a well-known manually or automatically variable manner upon an inward compression stroke of the plunger, and then to open it. For this purpose, the inner end of the plunger is provided with axially spaced relief portions which successively register with the port 42 during movements of the plunger and are partially divided by a helical edged portion 46 which, in an inward movement of the plunger, moves across the port 42 and effects a gradual closing thereof. The period of compressing action of the plunger 35 takes place during the middle portion of its instroke and is regulated by a turning of the plunger, which may be accomplished manually, or in a governor controlled manner, by the movement of a rack bar 47 in engagement with a rack pinion 48 on the plunger (Fig. 4), as well understood in the art, thus regulating the amount of fuel pumped into chamber 45 at each stroke of plunger 35. At the time the pumping stroke takes place, the outlet of chamber 45 is closed, as will be hereinafter described, so that the fuel pumped into chamber 45 raises piston 37, and the measured fuel charge is thus ready to be forced out of chamber 45 when an outlet passage is opened.

The inner end of the bore 33 in which the injection plunger 37 operates is provided near its lower end with a side recess 50 forming spaced outer and inner shoulders 51 and 52, respectively, and is connected by a passage 53 to a recess 54 in the wall of the bore 34 in which the timing valve 38 operates. The plunger 37 is provided in spaced relation to its inner end with a recess 55 which, when the plunger 37 is at the limit of its inward movement, opens communication between the passage 53 and a relief passage 56 that connects the bore 53 with a side recess 57 in the wall of the bore 34, as shown in Fig. 3. The head or inner operating end of the plunger 37 has its opposing edges 58 and 59 spaced relative to the spacing of the recess edges 51 and 52 so that slightly after the edge 58 passes the edge 51, in an inward movement of the plunger, the edge 59 will pass the edge 52, thus closing the passage 53 to the pressure chamber 45 and opening it to the relief passage 56 through the recess 55.

The outer end of the plunger 37 carries a piston 60 operating in a cylinder 61 of the body 30. The chamber formed by the cylinder 61 at the outer side of the piston 60, in the present embodiment of the invention, is in communication with the combustion chamber 10 of the engine through a connection 62, so that the pressure in the chamber 61 is substantially the same as that in the combustion chamber. As will appear later, this pressure is relatively low when it opposes the pumping of fuel into cavity 45, but is relatively high at the time it forces fuel from that cavity. The difference in areas of the piston 60 and inner end of the plunger 37 causes the pressure applied to the plunger to be materially increased in the charge chamber 45.

The trigger valve 38 has a recessed portion 65 which, when the valve is at and near the limit of its inward movement, cooperates with an endwise registering recess 66, in the wall of the bore 34, to open communication between the injection passage 53 and the injection passage 67, which latter leads to the fuel injector 68 for the combustion chamber 10. The valve 38 also has an elongated side recess 70 which crosses the adjacent end of the passage 56, when the plunger is at or near the inner end of its stroke, and at the same time registers with a recess 71 in the side wall of the bore 34, which has communication with a return or drainage passage 72 in the body. It is thus evident that the passages 56 and 72 are in communication at approximately the same time that the injection passages 53 and 67 are in communication. This permits pressure relief or drainage to take place from the injection passages 53, 67 through passages 56, 72 when the injection plunger 37 is at the inner end of its stroke.

The trigger valve 38 is provided at one end with a piston 78 working in a cylinder 79 and at the outer side of such piston with a smaller piston 80 working in a cylinder 81. The cylinder 79, at the outer side of the piston 78, has communication through a line 82 with one or both of the reverse bounce chambers 17 of the engine, so that the rebounce pressure in said chambers is exerted against the piston 78 to force the trigger valve 38 inward. The outer end of the cylinder 81 is in communication with the combustion chamber 10 of the engine through the line 62 so that combustion chamber pressure is also exerted on the trigger valve to force it inward or to open position relative to the injection passages 53, 67. The pistons 78 and 80 have the same relative areas as the power and reverse bounce cylinders of the engine. It is thus apparent that the injection plunger 37 and trigger valve 38 are subjected to the combustion chamber pressures in proportion to the square of the diameters of their respective pistons 60 and 80, and that with respect to the trigger valve the rebounce pressure of the engine is also effective to force it to its inward or injection position.

The timing plunger 36 projects at its inner end into a chamber 84 having an oil supply line 85 thereto in which an inwardly opening check valve 86 is provided. The oil in the supply line 85 is under a constant relatively low pressure. An oil supply passage 87 leads from the chamber 84 or supply line 85 to the inner end of the bore 34 in which the trigger valve 38 operates and has a check valve 88 therein opening toward said bore. The chamber 84 also has a port or passage 89 in communication with the lower end portion of the bore 34 a short distance above the point of communication with the bore of the passage 87. This port 89 is so positioned relative to the movement of the trigger valve that it is closed when the valve is at the innermost point of its movement and is gradually opened as the valve moves outward from such position as the side relief grooves 90 in the valve end move thereacross. These relief grooves also serve to open communication between the chamber 84 and a safety relief passage 91 in the body 30 should the chamber pressure be sufficient to move the valve to the limit of its outward stroke. The passage 91 connects with the drainage passage 72. A slow regulated leakage of oil from the chamber 84 is permitted through the passage 92 controlled by a needle valve 93. This passage has return drainage connection with the source of oil supply, in the present instance, through the drainage line 72.

An inward movement of the plunger 36 produces a displacement pressure in the chamber 84 acting first through the passage 87 and then through the port 89 against the inner end of the trigger valve 38 to move it to its outward position (Fig. 5) against the pressures in the piston chambers 79 and 81. The pressure in the chamber 84 is controlled by the speed of movement of plunger 36 and the rate of leakage from the throttle port 92. Near the end of the engine compression stroke, its piston velocity decreases, and the velocity of the plunger 36, which has a movement corresponding to the engine piston movement, accordingly decreases, so that it is no longer able to maintain pressure in the chamber 84 against the leakage occurring through port 92. In this manner the outward pressure against the inner end of the trigger valve 38 is also decreased. At the same time the pressures in chambers 79 and 81, in communication, respectively, with the rebounce and combustion chambers of the engine, are rapidly increasing. At a particular point in the stroke, determined by the degree of opening of the throttle port 92, the gas pressure in said chambers 79 and 81 overbalances the fluid pressure acting against the inner end of the trigger valve and the valve thereupon moves inward in a rather rapid manner. When the inner edge of the valve recess 65 passes the outer edge of the bore recess 54, the valve is moving at a high velocity, so that the injection passage 53 is quickly opened to the passage 67. The fluid under high pressure in chamber 45 is thus quickly released to the fuel injection valve 68 and an injection of a fuel charge into the combustion chamber is effected by the inward movement of plunger 37 due to the pressure in chamber 61.

This inward movement of plunger 37 resulting from pressure in chamber 61 continues until shoulder 58 thereon clears shoulder 51, thus opening communication between the injection passage 53 and relief passage 56. At this point in the operation, both the injection plunger 37 and the trigger valve 38 are at the ends of their inward strokes (Fig. 3) and relief communication is established between the injection passages 67 and 53 and the drainage passages 56 and 72. The sudden relief of pressure thus effected at the end of an injection reduces the tendency of the fuel nozzle to "dribble." After injection, the ensuing explosion occurring in the engine moves the engine pistons outwardly, thus withdrawing plungers 35 and 36 and allowing refilling of chamber 84 and the raising of pump piston 35 in position for another pumping stroke. The oil is supplied at moderate constant pressure to the inlet passages 42 and 85 by means of a pump 100 through a line 101. A return line 102 is provided to the pump from the drainage passage 72. The quantity of fuel delivered upon the injection stroke of the plunger 35 depends on the position of the helical groove on such plunger in relation to the inlet port 42.

In Figs. 6 to 11, which illustrate a practical and operative embodiment of the invention, the reference characters, except that each includes a prime exponent, correspond to those in the diagrammatical view in Figs. 3 and 5, and designate the same parts, chambers and passages, and the arrangement and operation thereof will be understood from the foregoing without repeating the description.

In the operation of this fuel pump, it will be understood that the movements of the plungers 35' and 36' are in exact duplication of the movement of the working pistons of the engine, except only that the motion of the plungers is reduced. During a compression stroke of the engine, the plunger 35' forces a measured quantity of fuel into the cavity 45' against the inner end of the injection valve 37' to force it outward against the pressure in the chamber 61' from the position shown in Fig. 3 to that shown in Fig. 5. At the same time, the plunger 36' moves into the fluid chamber 84' to increase the pressure therein and cause it to act through the passage 87' against the inner end of the trigger valve 38' to initially raise it to a position where the fluid pressure can also act on it through the port 89' to move it to the outer end of its normal stroke (Fig 5). This movement of the valve closes the communication between the injection passages 53' and 67 and the drainage passages 56' and 72'. Escape of fluid pressure from the chamber 84' is permitted at a predetermined rate through the valved metering port 92'. As the engine pistons approach their compression termini, a rapidly increasing pressure develops on pistons 60', 78' and 80' by virtue of the increase in the compression and rebounce pressures of the engine. The plunger 37', however, is retained against this mounting pressure on its piston 60' by means of the hydraulic lock existing in chamber 45' due to the check valve 44' and the closing of passages 53' and 56'. As the timing plunger 36' nears the end of its compression stroke, its movement is slowed down so that the leakage through port 92' then exceeds the displacing action of the plunger and this permits the increasing forces on the pistons 78' and 80' to force the trigger valve inward to connect the injection passages 53' and 67'. As these passages are uncovered, the hydraulic lock in chamber 45' is relieved, thereby permitting the pressure exerted on the injection plunger 37' to effect a rapid inward movement of the plunger and the sudden discharge of a metered quantity of fuel from the chamber 45' through said open passages to the injection nozzle.

The fuel injection means is arranged and adjusted so as to make injection occur at substantially the same relative part of the piston stroke of the engine independent of the speed, the stroke, the quantity of fuel injected, or the pressure. This is accomplished as follows: With drainage passage 91' closed off, the pressure in chamber 84' will be proportional to the square of the instantaneous piston speed which is proportional to the mean piston speed. The mean piston speed is approximately proportional to the square root of the sum of the combustion pressure, times area of combustion cylinder, plus reverse bounce pressure, times area of reverse bounce cylinder. Pistons 78' and 80' have the same relative areas as the power and reverse bounce cylinders. It follows that balance of forces on trigger valve 38' occurs at approximately the same relative part of the stroke independent of the stroke or piston velocity. The exact point at which the trigger valve 38' begins to move is fixed by the adjustment of the leakage at 92', and the smaller the opening at 92' the nearer will the engine pistons be to dead center position when said valve moves inward. After the trigger valve starts to move, an appreciable time, of the order of two milseconds, is required for injection to occur. This time is inversely proportional to the piston speed. Injection, therefore, occurs at the same relative part of the stroke independent of piston velocity. Injection may be made to occur directly at the end of the stroke although an earlier injection will generally be desirable. If it is desired that with higher speeds injection should occur earlier in the stroke, a compensating spring 95' may be placed in the bore 34 under the trigger valve 38' and made adjustable as to tension by a screw 96', as shown in Fig. 14. The injection pressure is proportional to the pressure acting on the inwardly moving injection plunger 37', and the duration of injection is determined by the injection pressure and the size of the orifices in the injection valve 68', which valve may be of any suitable type and need not, therefore, be specifically described.

In the construction described, the pressure in cylinder 61' varies with that in the combustion chamber, and increases when the combustion chamber pressure increases, thereby making the speed of injection vary with the pressure in the combustion chamber. Also the pressure in chamber 61' is less at the time the pumping operation of plunger 35' is forcing plunger 37' outward than when plunger 37' is ejecting the fuel. This is a desirable relation, but it will be understood that an approximation to the same results could be made by utilizing a constant pressure on plunger 37' in any desirable way, as for instance by high pressure air, as indicated in Fig. 12.

Likewise, while the arrangement described for operating trigger valve 38' effects a desirable automatic control, fairly good results might be obtained through timing plunger 36 even though one of pistons 78' or 80' was omitted, or one or both operated by constant pressure.

It is apparent that the pump plunger 35' forces a metered quantity of fuel into the charge chamber 45' against a yielding ejecting pressure exerted by the plunger 37'; that said chamber is in valve-controlled communication with the fuel injection nozzle of the engine; that the control valve 38' for said communication is held in closed position by pressure generated in the oil chamber 84' by an inward stroke of the plunger 36' which is effected by the compression stroke of the engine pistons simultaneously with the pumping stroke of the plunger 35', and that said valve is moved inward to open position by increasing fluid pressures generated in the engine during the compression strokes of its pistons, coordinated with a timed release of pressure from the chamber 84' through the controlled port 92' due to decreased speed of the plunger 36'. It will be understood that the time of injection of a charge with respect to the end of the compression stroke is dependent on the adjustment of the relief valve 93', and that the greater the relief opening the earlier will be the injection during the compression stroke of the engine pistons, and vice versa.

In Fig. 13, the application of fluid pressure to the trigger valve to move it to open position against the pressure in the chamber 84 (Fig. 8) is through separate pistons and a lever, with the pistons acting at different longitudinally spaced points on the lever. In this form pistons 80'' and 78'', corresponding to pistons 80 and 78, respectively, in the first form, operate in cylinders 81'' and 79'', respectively, with the former connected to the combustion chamber of the engine or to some other suitable source of fluid pressure supply, and the latter communicating with the reverse bounce space 17 of the engine. The stems of the pistons act against a lever 110, fulcrumed at 111, within the body part 30'', with the point of application of force of the piston 80'' closer to the lever fulcrum than that of the other piston. In this manner, the operating forces acting through the pistons and lever may be proportioned, as desired. A piston actuated movement of the lever is communicated to the trigger valve through an interposed compression spring 112. Movement of the lever is retarded by a plunger 113 connected to the lever and operating in a pot 114 with oil therein flowing slowly from one side to the other of the plunger, thus reducing the tendency of lever 110 to flutter during operation.

In Fig. 15 is shown a modification of the fuel pressure means operating on the trigger valve or plunger in opposition to the fluid pressure in the chamber 84 to effect and control the movements of such valve. In this modification, a plunger 115 operates in unison with the pump and timing plungers 35 and 36 of the forms previously described in parallelism therewith, being attached to the cross member 39 connecting said plungers. Its inner end reciprocates in a bore 116 in the body 117 (corresponding to the body 30 of the first form), the inner end of said bore having communication through the passage 118 with a pressure chamber 119 to which the outer end of the trigger valve, marked 120, is exposed. A check valve 121 opening toward said chamber is disposed in said passage. The inner end of the plunger 115 serves as a valve for controlling admission of oil under predetermined pressure, for instance that from the outgoing side of the pump 100 to the chamber 119, through a passage 122. The passage 122 is closed to the inner end of the bore 116 by the plunger 115 except during an intermediate portion of its stroke. The chamber 119 has a pressure relief passage 123 controlled by a needle valve 124. A cylinder 125 has a piston 126 therein which is acted on at one side by pressure in the chamber 119 through a passage 127 and at its other side by a spring 128 in a cylinder 129.

It is apparent that with the use of this form, variable timing is effected by means of plunger 115 which pumps a fixed quantity of oil into the chamber 119 at each instroke of the plunger, and consequently of the engine pistons. The needle valve 124 is so adjusted as to allow an equal quantity of oil to that pumped to escape from the chamber 119 during a pumping cycle of plunger 115 when the engine is operating at predetermined reduced speed. Upon an increase of engine speed, the faster pumping action of the plunger 115 tends to increase the pressure in chamber 125 and to push the piston 126 outward against the pressure of the spring 128. The resulting increased pressure effected by spring 128 causes the trigger valve 120 to react more quickly to the pressure balance in chamber 84, thus effecting an earlier inward movement of the trigger valve 120 against the pressure in the timing chamber 84 and a consequent earlier charge injection. The pressure will not continue to increase in chamber 125 for a set speed, as the instantaneous flow of oil past valve 124 is a function of this feature. Thus, the pressures existing upon the trigger valve 120 are a direct function of the engine speed. Any oil pressure escaping around piston 126 is relieved through a passage 129 leading to the relief passage 123 at the outer side of the valve 124.

In the modification shown in Fig. 16, the fluid pressure acting on the trigger valve or plunger in opposition to the fluid pressure in the timing chamber 84 is eliminated and a compression spring of predetermined tension substituted therefor. In this modification, 130 designates the trigger valve and 131 a coiled compression spring set into a cylinder 132 and acting against the outer end of said valve at a pressure which is less than the maximum pressure created in the chamber 84 during an instroke of the timing plunger and is greater than the pressure in said chamber when the timing plunger speed is slowing up at the end of said stroke. Thus, the trigger valve is moved to closed position against the tension of the spring 131 when the maximum pressure is present in chamber 84 and is moved by the spring to open injection position when the spring pressure overbalances the timing chamber pressure immediately before the end of the instroke of the timing plunger.

In Figure 17 is shown a modification whereby adjustment of the relief valve for the timing pressure in chamber 84 is automatically responsive primarily to the maximum fluid pressures generated in the working cylinder and rebounce cylinders of the engine. This function automatically controls the timing with reference to the peak pressures existing in the above chambers. In this modification the relief valve for the timing pressure chamber 84 is designated 135 and is attached to a piston 136 operating in a cylinder 137 in the body, here designated 138. The piston 136 at its outer end carries a larger piston 139 operating in a cylinder 140 against a valve closing spring 141 at its outer side, the tension of which spring is adjustable by a screw member 142 in the body part. The cylinder 137 at the inner side of the piston 136 has communication with the combustion chamber of the engine through a passage 143, which may constitute a branch of the passage 62 disclosed in the first illustrated form. An inwardly opening check valve 144 is provided in the passage 143, and a leak by-pass 145 is provided around said valve and has a needle control valve 146 therein. The cylinder 140 at the inner side of its piston has communication with the rebounce pressures of the engine through a passage 147, which may constitute a branch of the passage 82 of the first illustrated form. An inwardly opening check valve 148 is provided in the passage 147 and a leakage by-pass 149 is provided around such valve and has a needle control valve 150 therein.

In the operation of this modification (Fig. 17), in connection with any of the various fuel injection means and modifications illustrated, it will be understood that during an inward stroke of the pump plunger (36 in the first form), oil is escaping past the valve 135 into the leakage line 151 from the pressure chamber 84, and that during the major portion of such stroke, such escape is less than the pressure build-up in the chamber 84, so that the trigger value of the associated form is thereby moved to closed position against the opposing forces acting thereon. When the speed of movement of the timing plunger begins to slow down at the end of its instroke, the pressures existing in chambers 137 and 140 are such as to maintain a predetermined opening of the relief passage 151 from chamber 84. Due to the reduction of velocity of the timing plunger 36, the rate of relief from chamber 84 relative to the displacement of the plunger has increased, whereby opening movement of the trigger valve is permitted. It is thus apparent that the rate at which the oil is allowed to flow from the pressure chamber 84 through the relief passage is a function of the current maximum engine compression pressure exerted on the piston 136 and of the maximum current rebounce pressure exerted on the piston 139. These pressures are maintained at a relatively steady value by means of the restricted leak-off valves 146 and 150 in the respective by-passes around the check valves 144 and 148, and pressure variations on the pistons 136 and 139 are therefore allowed only as the peak pressures of the combustion and rebounce chambers vary. These pressures are resisted by spring 141 which tends to force the valve 135 into its closed position. As the speed of the engine increases, the pressures exerted under pistons 136 and 139, and particularly the latter, increase, and this effects a relatively greater opening of valve 135, thereby allowing a greater quantity of oil to escape which permits an earlier movement of the trigger valve relative to the inner terminal position of the timing plunger and a consequent earlier injection of a fuel charge into the cylinders with regard to the combustion end of the piston compression stroke. As the speed of the unit decreases, the natural reduction of pressures under pistons 136 and 139 tends to cause a reverse timing action to occur.

In Fig. 18 is shown a different connection from that illustrated in Fig. 1 for communicating motion from the engine synchronizing mechanism to the pump and timing plungers 35 and 36 of the fuel injection means. In this form, 24 is the driven shaft of the synchronizing mechanism, being driven by pinion connection with the rack bars 23 projecting from the opposing pistons. This shaft carries a pinion 155 in lieu of the eccentric 25 of Fig. 1, and this meshes with and imparts rocking movements to a segmental rack 156 that has a stationary fulcrum 157 on a convenient part of the engine frame. A link 138 is pivotally connected at one end to the segment 156, intermediate its fulcrum and rack portion, and at its other end to the cross bar 39 connecting the pump and timing plungers 35 and 36, so that reciprocatory movements of the segment will impart corresponding movements to said plungers.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In an internal combustion engine of the free piston type having means for injecting fuel into the cylinder of the engine, means for timing the fuel injection with the timing varying in accordance with variations in the stroke of a working piston of the engine comprising means opposing the start of fuel injection with a force decreasing as the speed of the engine pistons decrease on their compression strokes, and means tending to start the fuel injection by a force which does not decrease as the pistons approach the end of the compression stroke.

2. In an internal combustion engine of the free piston type having a fuel injection nozzle, fuel control means comprising a fuel charge chamber, means providing a passage from the chamber to the nozzle, a valve controlling said passage, means for forcing a charge from said chamber to said nozzle when the valve is open, and means for timing the opening of the valve and causing the time of injection to vary in accordance with variations in the stroke of a working piston of the engine, comprising means tending to open the valve and a device connected with at least one of the engine pistons and opposing the opening of the valve with decreasing force as the speed of the engine pistons is reduced in nearing the end of its compression stroke.

3. In an internal combustion engine of the free piston type having a fuel injection nozzle, fuel control means comprising a fuel charge chamber, means providing a passage from the chamber to the nozzle, a valve controlling said passage, means for forcing a charge from said chamber to said nozzle when the valve is open, and means for timing the opening of the valve and causing the time of injection to vary in accordance with variations in the stroke of a working piston of the engine and comprising means opposing the opening of the valve, and means tending with increasing force to open the valve as the engine pistons approach the end of the compression stroke.

4. In an internal combustion engine of the free piston type having a fuel injection nozzle, fuel control means comprising a fuel charge chamber, means providing a passage from the chamber to the nozzle, a valve controlling said passage, means for forcing a charge from said chamber to said nozzle when the valve is open, and means for timing the opening of the valve and causing the time of injection to vary in accordance with variations in the stroke of a working piston of the engine, comprising a fluid chamber having a controlled leakage opening, a plunger connected for movement proportional to the movement of the engine pistons and moving into said fluid chamber during the compression stroke of the engine pistons, and means directing the pressure in said fluid chamber to move the valve to closed position and opposing a pressure that does not decrease during the compression stroke of the engine and which tends to open the valve.

5. In an internal combustion engine of the free piston type having a fuel injection nozzle, fuel control means comprising a fuel charge chamber, means providing a passage from the chamber to the nozzle, a valve controlling said passage, means for forcing a charge from said chamber to said nozzle when the valve is open and means for timing the opening of the valve and causing the time of injection to vary in accordance with variations in the stroke of a working piston of the engine, comprising a fluid chamber having a controlled leakage opening, a plunger connected for movement proportional to the movement of the engine piston and moving into said fluid chamber during the compression stroke of the engine pistons, means directing the pressure in said fluid chamber to move the valve to closed position, a cylinder and piston therein, connections from the cylinder to the compression chamber of the engine, and connections from said last piston to the valve whereby movement of the piston in response to pressure from the compression chamber opens the valve.

6. In an internal combustion engine of the free piston type having a rebounce chamber and an injection nozzle, fuel control means comprising a valve, and means to force a charge through the injection nozzle when the valve is open, means controlling the valve and comprising a fluid chamber with a controlled leakage opening, a timing plunger movable into and out of said chamber, connections between the timing plunger and the engine pistons to move the timing plunger proportionately with the engine pistons and into said fluid chamber during the compression stroke of the engine pistons, means directing the pressure in said fluid chamber to oppose the opening of said valve, a cylinder and piston connected to the valve and tending to open the valve when there is pressure in the cylinder, means connecting the cylinder to the compression chamber of the engine, and another cylinder and piston also connected with the valve and tending to open the valve when there is pressure in the last said cylinder, and a connection from the last said cylinder to the rebounce chamber.

7. In an internal combustion engine of the free piston type having metering means for injecting fuel into the cylinder of the engine including an injection valve movable to closed and open injection positions, means acting to normally hold the valve in open position and yieldingly resisting its movement to closed position, and fuel injection timing means including a fluid pressure feature acting against said valve in opposition to said first means and a fluid displacing feature, said last feature being operable by the engine pistons during a portion of their compression strokes to increase said fluid pressure to move the valve to closed position against the pressure of said first means, said timing means also including a feature which automatically reduces its fluid pressure sufficient to permit the valve to move to open injection position when the engine pistons are near the ends of their compression strokes.

8. An arrangement as called for in claim 7 wherein the pressure reducing feature of said timing means operates during the speed changing period of movement of the engine pistons when near the compression ends of their strokes to permit the valve to move to open injection position before the completion of the said compression strokes.

9. An arrangement as called for in claim 7 wherein the pressure reducing feature of said timing means includes a pressure relief means which is responsive to fluid pressures generated by the engine during a compression stroke of its pistons and which operates to reduce the valve closing pressure of said timing means below the opening pressure of said first means during the speed changing period of the engine pistons when near the ends of their compression strokes, said pressure relief means being regulable to vary the opening time of the valve relative to the depending engine pressures.

10. In an internal combustion engine of the free piston type having metering means for injecting fuel into the cylinder of the engine including a trigger valve movable to closed and open injection positions, means normally holding the valve in open injection position and yieldingly resisting a movement of the valve to closed position, the action of said last means being responsive to fluid pressures, one at least of which is automatically increased during the compression stroke of the engine pistons, and fuel injection timing means including a fluid pressure feature acting against said valve in opposition to said first means and a fluid displacing feature, said last feature being operable by the engine pistons during a portion of their compression strokes to increase said fluid pressure to move the valve to closed position against the pressure of said first means, said timing means including a bleed member which automatically reduces its fluid pressure sufficient to permit the valve to move to open injection position during the speed changing movements of the engine pistons when near the ends of their compression strokes.

11. In an internal combustion engine of the free piston type having metering means for injecting fuel into the cylinder of the engine including a trigger valve movable to closed and open injection positions, means normally holding the valve to open injection position and yieldingly resisting a movement of the valve to closed position, said means being responsive to fluid compression pressures generated by the engine during a compression stroke of its pistons and which pressures increase during said strokes, and fuel injection timing means including a fluid pressure feature acting against said valve in opposition to said first means and a fluid displacing feature, said last feature being operable by the engine pistons during a portion of their compression strokes to increase said fluid pressure to move the valve to closed position against the pressure of said first means, said timing means also including a bleed member which automatically reduces its fluid pressure sufficient to permit the valve to move to open injection position when the engine pistons are near the ends of their compression strokes.

12. In an internal combustion engine of the free piston type having metering means for injecting fuel into the cylinder of the engine including a trigger valve movable to closed and open injection positions, means normally holding the valve in open injection position and yieldingly resisting its movement to closed position, and fluid injection timing means including a fluid pressure feature acting against said valve in opposition to said first means and a fluid displacing feature, the latter operable by the engine pistons during a portion of their compression strokes to increase said fluid pressure to move the valve to closed position against the pressure of said first means, said timing means including a relief passage and a regulable control valve therefor to permit an escape of fluid pressure from said timing means to permit said first valve to move to open position when the engine pistons are near the ends of their compression strokes and before completing such strokes.

13. In an internal combustion engine of the free piston type having metering means for injecting fuel into the cylinder of the engine including a trigger valve movable to closed and open injection positions, means normally holding the valve in open injection position and yieldingly resisting its movement to closed position, said means including a fluid pressure actuating force which automatically increases throughout at least a portion of the length of the compression stroke of the engine pistons, and fuel injection timing means including a fluid pressure feature acting against said valve in opposition to said first means and a fluid displacing feature, the latter being operable by the engine pistons during a portion of their compression strokes to increase said fluid pressure to move the valve to closed position against the pressure of said first means, said timing means having a pressure relief feature which cooperates with the increasing pressure of said first means to overbalance said timing means pressure and effect a quick movement of the valve to open position during the last portion of a compression stroke of the engine pistons.

14. In an internal combustion engine of the free piston type having metering means for injecting fuel into the cylinder of the engine including a trigger valve movable to closed and open injection positions, means normally holding the valve in open position and yieldingly resisting its movement to closed position, said means increasing in pressure during each compression stroke of the engine pistons, and fuel injection timing means including a fluid pressure means acting on said valve and pressure during a compression stroke of the engine pistons to move the valve to closed position and then during the speed changing movement of the pistons near the end of the compression stroke acting to decrease said pressure to permit a movement of the valve to open position.

15. In an internal combustion engine of the free piston type having a fuel injection nozzle with a fuel passage thereto and a valve normally closing the passage and operable to open the passage and permit fuel injection, a member connected to a working piston of the engine to reciprocate in synchronism therewith, and means for opening the valve controlled by reciprocation of the member and comprising means to adjust the timing of the opening of the valve automatically to bring it into predetermined relation with the end of the compression stroke of the piston when the length of the stroke is varied.

16. The method of timing fuel injection in an internal combustion engine of the free piston type, which comprises determining the time of injection by the time when a pressure from the compression chamber of the engine during a compression stroke overcomes a pressure resisting fuel injection, which latter pressure decreases with the decrease of the speed of a piston of the engine on its compression stroke.

17. The method of timing fuel injection in an internal combustion engine of the free piston type and provided with a rebounce chamber, which comprises determining the time of injection by the time when the rebounce pressure on a compression stroke of the pistons overcomes a pressure resisting fuel injection, which latter pressure decreases with the decreasing speed of the pistons as they near the ends of their compression strokes.

18. The method of timing fuel injection in an internal combustion engine of the free piston type and provided with a rebounce chamber, which comprises determining the time of injection by the time when pressure from the rebounce chamber and the compression chamber of the engine on a compression stroke of the pistons overcomes a pressure resisting fuel injection, which latter pressure decreases with the decreasing speed of the pistons as they near the ends of their compression strokes.

19. In an internal combustion engine of the free piston type having a fuel injection nozzle, a fuel injection passage thereto, and a valve operable to open and close said passage, means forming a chamber having an inwardly opening check valve controlled communication with a fluid pressure supply source and also having a controlled pressure bleed outlet, means operable by the engine pistons to increase the pressure in said chamber a predetermined extent to move the valve to closed position during a compression stroke of the pistons, and means operable by a predetermined compression pressure of the engine to yieldingly oppose movement of the valve to closed position and to overcome said chamber pressure and move the valve to open position for the injection of a fuel charge when the pistons are at or near the terminus of their compression strokes.

20. In an internal combustion engine of the free piston type having a fuel nozzle and a fuel injection passage thereto, a valve operable to open and close said passage, means forming a chamber in communication with said passage, means to pump a charge of fuel into said chamber and preventing its return, yielding pressure means movable against its pressure by a charge pumped into the chamber and operable by its pressure to cooperate with the charge pressure to eject a fuel charge from said chamber and through said passage when the latter is open, and means timing the opening of said valve in accordance with the slowing-down of the engine piston on a compression stroke preparatory to reversing their movements.

21. In an internal combustion engine of the free piston type having a fuel nozzle and a fuel injection passage thereto, a valve operable to open and close said passage, means forming a chamber in communication with said passage, a plunger movable to force a charge from said chamber through said passage when open, means to pump a charge of fuel into said chamber and preventing its return and to force the plunger to retracted position, fluid pressure means yieldingly resisting a retracting movement of the plunger and acting to impart a high pressure charge ejecting movement thereto, and means timing the opening of said valve in accordance with the slowing-down of the engine pistons on a compression stroke preparatory to reversing their movements.

FRANK M. LEWIS.

REFERENCES CITED

The following references are of record in the file of this patent:

UNITED STATES PATENTS

| Number | Name | Date |
|---|---|---|
| 998,463 | Butsch | July 18, 1911 |
| 1,897,044 | Elwell | Feb. 14, 1933 |
| 2,064,976 | Jahnicke | Dec. 22, 1936 |
| 2,163,313 | Voit | June 20, 1939 |
| 2,246,701 | Steiner | June 24, 1941 |
| 2,344,058 | Pescara | Mar. 14, 1944 |

FOREIGN PATENTS

| Number | Country | Date |
|---|---|---|
| 427,668 | Great Britain | 1935 |
| 475,730 | Great Britain | Nov. 24, 1937 |
| 509,111 | Great Britain | July 11, 1939 |
| 210,884 | Switzerland | 1940 |

OTHER REFERENCES

Hurst (A. P. C. P.), Ser. No. 348,726, pub. May 11, 1943.

Certificate of Correction

Patent No. 2,447,513.

August 24, 1948.

FRANK M. LEWIS

It is hereby certified that errors appear in the printed specification of the above numbered patent requiring correction as follows: Column 2, line 17, for the word "charges" read *charge*; column 3, line 19, for "divide" read *divided*; column 5, line 57, for "combusion" read *combustion*; column 7, line 36, for "67" read *67'*; column 15, line 20, after "and" insert *a plunger feature, the latter connected to a piston of the engine and operable to increase the fluid*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*